(12) United States Patent
Berner et al.

(10) Patent No.: US 10,867,077 B2
(45) Date of Patent: Dec. 15, 2020

(54) METHOD OF ACCESSING FUNCTIONS OF AN EMBEDDED DEVICE

(71) Applicant: Schneider Electric Automation GmbH, Marktheidenfeld (DE)

(72) Inventors: Ralf Berner, Meckenbeuren (DE); Thomas Gleixner, Uhldingen (DE)

(73) Assignee: Schneider Electric Automation GmbH, Marktheidenfeld (DE)

( * ) Notice: Subject to any disclaimer, the term of this patent is extended or adjusted under 35 U.S.C. 154(b) by 154 days.

(21) Appl. No.: 15/526,110

(22) PCT Filed: Nov. 13, 2015

(86) PCT No.: PCT/EP2015/076534
§ 371 (c)(1),
(2) Date: May 11, 2017

(87) PCT Pub. No.: WO2016/079018
PCT Pub. Date: May 26, 2016

(65) Prior Publication Data
US 2017/0308720 A1    Oct. 26, 2017

(30) Foreign Application Priority Data

Nov. 18, 2014 (DE) .......... 10 2014 116 883

(51) Int. Cl.
*G06F 21/76* (2013.01)
*G05B 19/042* (2006.01)
(Continued)

(52) U.S. Cl.
CPC .......... *G06F 21/76* (2013.01); *G05B 19/0428* (2013.01); *G05B 19/058* (2013.01);
(Continued)

(58) Field of Classification Search
None
See application file for complete search history.

(56) References Cited

U.S. PATENT DOCUMENTS

| 5,127,099 | A | 6/1992 | Zifferer et al. |
| 6,411,987 | B1 * | 6/2002 | Steger ............ H04L 29/06 700/9 |

(Continued)

FOREIGN PATENT DOCUMENTS

| DE | 102 29 704 A1 | 1/2004 |
| DE | 10 2007 062 915 A1 | 6/2009 |

(Continued)

OTHER PUBLICATIONS

International Search Report dated Jan. 26, 2016 in PCT/EP2015/076534.

(Continued)

*Primary Examiner* — Benjamin E Lanier
(74) *Attorney, Agent, or Firm* — Oblon, McClelland, Maier & Neustadt, L.L.P.

(57) ABSTRACT

A method for accessing functions of an embedded device, for example a controller programmable from memory, wherein function blocks of the embedded device are assigned to at least two hierarchically superimposed levels, an access to a function block of the embedded device occurs from outside of the embedded device by a data interface, and for access an authentication must occur for the level to which the respective function block is assigned, and again for each individual level above the level to which the function block is assigned, to permit execution of a function of the function block, wherein the functions of the function blocks permit access to a firmware of the embedded device.

20 Claims, 2 Drawing Sheets

Figure 1:
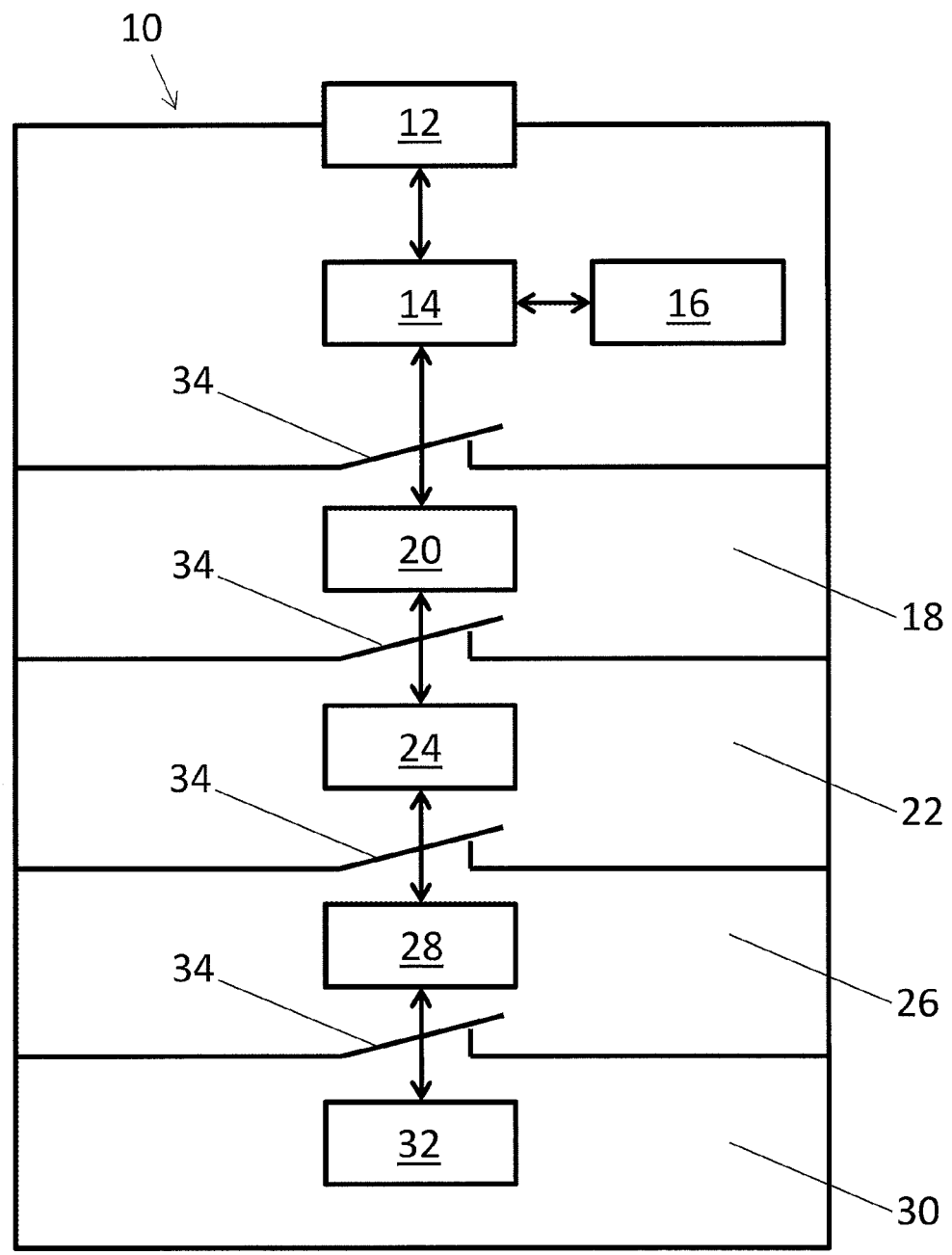

(51) Int. Cl.
    *G05B 19/05*     (2006.01)
    *G06F 21/31*     (2013.01)
    *G06F 21/60*     (2013.01)

(52) U.S. Cl.
    CPC .............. *G05B 2219/13195* (2013.01); *G05B 2219/24167* (2013.01); *G06F 21/31* (2013.01); *G06F 21/602* (2013.01)

(56) References Cited

U.S. PATENT DOCUMENTS

| | | | |
|---|---|---|---|
| 7,536,548 | B1* | 5/2009 | Batke .................... H04L 63/061 713/166 |
| 2003/0014498 | A1* | 1/2003 | Kreidler ............. G05B 19/0426 709/217 |
| 2005/0246529 | A1* | 11/2005 | Hunt .................... H04L 9/3273 713/168 |
| 2006/0013393 | A1 | 1/2006 | Ferchichi et al. |
| 2006/0168453 | A1 | 7/2006 | Da Silva Neto |
| 2007/0067121 | A1* | 3/2007 | Przydatek ............. G01R 22/06 702/57 |
| 2007/0162957 | A1* | 7/2007 | Bartels .................. G05B 15/02 726/2 |
| 2007/0201540 | A1* | 8/2007 | Berkman ............... H04B 3/542 375/219 |
| 2008/0082184 | A1 | 4/2008 | Murakami |
| 2008/0109889 | A1* | 5/2008 | Bartels ................ H04L 63/0428 726/7 |
| 2008/0209211 | A1* | 8/2008 | Grgic .................. G06F 21/6236 713/166 |
| 2008/0238594 | A1* | 10/2008 | Liu ........................ H01H 47/02 335/229 |
| 2009/0064026 | A1* | 3/2009 | Walker ................. G05B 19/058 715/772 |
| 2009/0125983 | A1* | 5/2009 | Kassou .................. G05B 19/05 726/4 |
| 2011/0154438 | A1 | 6/2011 | Price |
| 2012/0005735 | A1* | 1/2012 | Prasanna ................ H04L 9/321 726/7 |
| 2012/0116547 | A1 | 5/2012 | Shigehara |
| 2013/0117803 | A1* | 5/2013 | Markham ............. G06F 21/575 726/1 |
| 2013/0151849 | A1 | 6/2013 | Graham et al. |
| 2013/0208103 | A1* | 8/2013 | Sands ..................... G06F 21/31 348/78 |
| 2014/0336786 | A1* | 11/2014 | Asenjo ............... G05B 19/4185 700/17 |
| 2015/0040192 | A1* | 2/2015 | Kobold ................ H04L 63/083 726/4 |
| 2015/0089666 | A1* | 3/2015 | Lee ......................... G06F 21/53 726/27 |

FOREIGN PATENT DOCUMENTS

| | | |
|---|---|---|
| EP | 1 887 447 A2 | 2/2008 |
| EP | 2 458 463 A1 | 5/2012 |

OTHER PUBLICATIONS

International Preliminary Report on Patentability and Written Opinion dated Jun. 1, 2017 in PCT/EP2015/076534.
German Search Report dated Oct. 28, 2015 in Patent Application No. 10 2014 116 883.6.

* cited by examiner

METHOD OF ACCESSING FUNCTIONS OF AN EMBEDDED DEVICE

The present invention relates to a method of accessing functions of an embedded device, in particular of a programmable logic controller.

Embedded devices, i.e., for example, programmable logic controllers (PLCs), are used in a plurality of fields to control machinery and plant. Such embedded devices in particular control automated processes such as production lines, power plants or water supply systems.

The embedded devices typically themselves have no safety mechanisms or only very slight safety mechanisms that prevent access of unauthorized persons to the embedded devices. Such access can, for example, take place by means of a data connection using remote access. To achieve a certain protection of the embedded devices, the embedded devices are conventionally protected by means of a separate firewall or by completely walled-off data networks.

Disadvantageously, an attacker e.g. only has to overcome the firewall to be able to access embedded devices "behind" the firewall. Defending against such threats is in particular becoming more and more important with respect to the increasing networking of embedded devices and the further increasing number of attacks over the internet or over data networks.

It is therefore the object underlying the invention to provide an embedded device and a method for accessing such an embedded device that ensure increased security of the embedded device.

This object is satisfied by a method in accordance with claim 1 and in particular in that
(a) functional blocks of the embedded device are associated with at least two levels disposed above one another hierarchically;
(b) access to a functional block of the embedded device from outside the embedded device takes place by means of a data interface; and
(c) an authentication has to take place during the access for the level with which the respective functional block is associated and again for every single level disposed above the level associated with the functional block to permit an execution of a function of the functional block, wherein the functions of the functional blocks permit access to firmware of the embedded device.

It is in this respect the underlying recognition of the invention that the security of the embedded device can be greatly increased if the embedded device is itself equipped with security functions. For this purpose, the functions of the embedded device are divided into functional blocks that are in turn associated with levels disposed above one another hierarchically. In order, for example, to access a level below the topmost level, an authentication must first take place for the topmost level. Subsequently, another authentication has to be carried out for the lower level.

The security mechanism thus implemented is based on a layered principle that makes multiple authentications necessary for functions in lower levels. The security, in particular of functional blocks in lower levels, is considerably increased on the basis of the optionally required multiple authentication.

A plurality of functional blocks can preferably also be arranged in one level, wherein the respective same number of authentication processes is required for the functional blocks in one level. Access to all the functional blocks of the level can, however, not be automatically granted on an authentication for one functional block. Instead, a complete repeat authentication can be required for every functional block of the level.

The hierarchy of the levels disposed above one another can be purely virtual or can be provided by a corresponding consecutive connection of hardware of the embedded device. The advantage additionally results due to the division of the functionality of the embedded device into a plurality of functional blocks that only parts of the functionality of the embedded device are released on a successful attack.

If a user is authenticated for a level, he can access the functions of functional blocks, i.e. he can utilize their functionality and can, for example, change the embedded device, read out parameters or control connected further devices.

Advantageous embodiments of the invention can be seen from the description, from the dependent claims and from the drawings.

In accordance with a first advantageous embodiment, the functions of the functional blocks also permit access to the application program executed on the embedded device. Firmware is present on the embedded device that acts as the operating system. The firmware can also provide a so-called "runtime" that is preferably real-time capable and executes an application program. The application program can, for example, include control commands for controlling an industrial plant and the like. The functions of the functional blocks can therefore relate both to the firmware and to the application program. Access to functions of the firmware and/or of the application program can thus take place by the authentication for different levels.

In accordance with a further advantageous embodiment, the authentication for different levels takes place by different keys. The security of the embedded device is additionally increased by the use of different keys.

The embedded device preferably uses a key-based cryptographic process for the authentication for a level. A random number is, for example, generated, wherein the key for the authentication for the respective level is generated by encrypting the random number by means of a public key and the embedded device decrypts the key by means of a private key and compares the result of the decryption with the random number. The encryption of the random number can be carried out by a user who has access to the embedded device.

An asymmetrical encryption process can therefore be used to generate the key and to verify the key. The public and private keys belong together and form a key pair. The random number can differ for every authentication process, whereby a hacking of the keys transmitted to the embedded device also does not produce a successful attack. The embedded device releases the respective functional block when the respective generated random number and the decrypted key are the same.

Alternatively, a symmetrical encryption process can also be used for authentication at a level. The random number can in particular be encrypted and decrypted using the symmetrical encryption process for this purpose.

The input of a password to carry out an authentication for a level can also take place as a further alternative. A combination of the input of a password and the additional use of a cryptographic process can likewise take place.

The embedded device can preferably provide a web server via which the functional blocks of the embedded device can be accessed. The access can in particular take place by means of an internet connection, with a browser being used to present the contents transmitted from the web server.

If, for example, an asymmetrical encryption process is used for authentication, for example, a public key required for this purpose can be stored or installed as a certificate in the browser, whereby the authentication can take place at the embedded device without any interaction of a user. A separate certificate can preferably be used for each level, which further increases the security of the embedded device.

A user can establish a data connection to the embedded device using a web browser during the operation of the embedded device, whereupon the web server of the embedded device transmits a random number to the browser. The random number can be encrypted in the browser (e.g. by means of a plug-in) and in the public key of a certificate. The encrypted random number is sent back to the web server of the embedded device and is decrypted by the web server by means of the private key. If the random number and the decrypted value agree, a respective functional block is released. If access to a functional block in a lower level is requested by means of the browser, the previously described authentication is carried out several times after one another using different random numbers. No intervention of the user is required for this purpose.

In accordance with the above example, a symmetrical encryption process can also be used instead of the asymmetrical encryption process. The random number can then be respectively encrypted in the browser and decrypted in the embedded device using the same key.

In accordance with a further advantageous embodiment, a first functional block that permits direct access to hardware of the embedded device is arranged in a first level, that is the lowest level, with a function belonging to the first functional block in particular permitting direct access to a network interface. The network interface can be identical to the data interface or it can permit a separate data connection. The functions of the first functional block can, for example, enable the direct control of the hardware of the data interface or of a fieldbus interface (e.g. CAN bus—controller area network bus or SERCOS 3). The firmware of the embedded device can in particular enable the access to the hardware. Since access to the hardware can enable the complete control of the embedded device, the first functional block is arranged in the lowest level that offers the greatest security.

In accordance with a further advantageous embodiment, a second functional block that permits direct access to an operating system kernel of the embedded device is arranged in a second level that is disposed above the first level. In this respect, a function belonging to the second functional block in particular permits direct access to a file system. The file system can belong to the firmware of the embedded device or can be generated by the firmware.

In accordance with a further advantageous embodiment, a third functional block that permits access to the executed application program is arranged in a third level that is disposed above the second level. In this respect, a function belonging to the third functional block in particular permits a monitoring of the executed application program. A monitoring of the application program, but also of the firmware, can therefore be carried out by means of the third functional block.

In accordance with a further advantageous embodiment, a fourth functional block that permits access to a web server of the embedded device is arranged in a fourth level that is disposed above the third level. In this respect, a function belonging to the fourth functional block in particular permits a data input and a data output at the web server. This means that the access to the web server itself can also already be protected by an authentication.

Access to functions of the embedded device is preferably checked by a firewall of the embedded device. The firewall can be provided by the embedded device itself, i.e. it can, for example, be integrated in the embedded device as separate hardware. The firewall can provide additional security for the embedded device in that the firewall, for example, carries out a preselection of authorized queries with reference to predefined rules.

In addition, the firewall can serve as the end point of a VPN (virtual private network) connection. In this case, only access attempts by means of the VPN connection can be authorized by the embedded device.

In accordance with a further advantageous embodiment, a user management is used in which users are stored to whom an authentication is permitted for predefined functional blocks. The authentication can take place centrally, for example by means of an access control matrix (ACM) or in the respective level. An access control list (ACL) can be present for the respective level. Those users can be stored in the access control matrix and in the access control list who may respectively access the functional blocks of a specific level. The access control list for a level can be respectively stored in the level disposed above it.

In this respect, user groups having access to different levels can also be formed. Only the respective lowest level to which a user or a user group has access can in particular be indicated in the access control matrix.

The individual users can each be identified via a certificate or via their respective public and private keys.

The access control matrix can preferably communicate with the different levels by means of interprocess communication. In this respect, the DBus known from Linux can be used, for example. The embedded device can preferably use Linux as the operating system for this purpose or can be set up on a Linux-based operating system.

The invention furthermore comprises an embedded device, in particular a programmable logic controller, having a data interface, a processing device, and a memory device. The embedded device is characterized in that the processing device is configured to associate functional blocks of the embedded device with levels disposed hierarchically above one another; and to carry out an authentication on access to a functional block of the embedded device from outside by means of the data interface for the level with which the functional block is associated and again for every single level disposed above the level associated with the functional block before an execution of a function of the functional block is permitted, with the functions of the functional blocks permitting access to firmware of the embedded device and in particular also permitting access to an application program executed on the embedded device.

The firmware and the software of the embedded device can be stored in the memory device, with both firmware and software being executed by the processing device.

In accordance with an advantageous embodiment, the embedded device is configured to execute a real-time application. The real-time capability of the embedded device is in particular necessary for the control of time-critical industrial processes to enable an interplay of different components in such industrial processes. The embedded device is therefore in particular not a "conventional" personal computer (PC).

A fieldbus connector is preferably provided at the embedded device and the embedded device is preferably operable at a voltage of 24 V. The embedded device can thus be easily integrated into the conventional infrastructure of automation processes. The fieldbus connector can e.g. in this respect be a connector for the CAN bus.

In another respect, the statements made with respect to the method in accordance with the invention apply to the embedded device in accordance with the invention.

Figure 2:
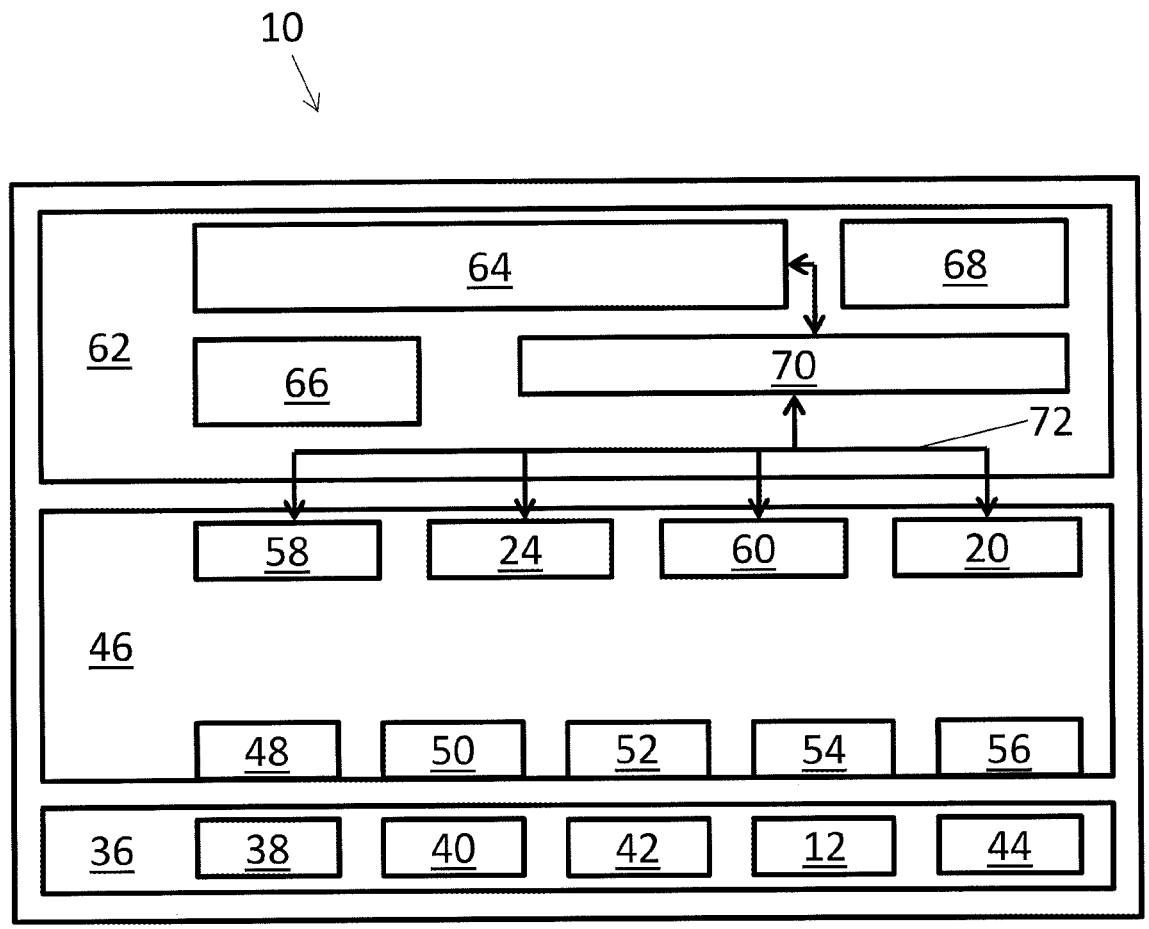

The invention will be described in the following purely by way of example with reference to the drawings. There are shown:

FIG. 1 a schematic view of an embedded device having levels disposed hierarchically above one another and having associated functional blocks; and FIG. 2 a schematic view of the firmware and software of an embedded device.

FIG. 1 schematically shows an embedded device, namely a programmable logic controller (PLC) 10. The PLC 10 comprise an Ethernet connector 12 that serves as a data interface for communication with e.g. a web browser of a computer (not shown).

The data incoming via the Ethernet connector 12 are monitored by a firewall 14 using firewall rules 16. Only authorized queries or data are passed through by the firewall 14.

Once a query has passed the firewall 14, it is possible to access functional blocks that are disposed above one another hierarchically after a further authentication. In this respect, a web server 20 is arranged in a topmost level, i.e. the fourth level 18. A monitoring service 24 is associated with the third level 22 below it. The access to an application program can also be associated with the third level 22.

The second level 26 is provided beneath the third level 22 and the operating system kernel 28, i.e. the runtime, is associated therewith. The lowest and thus first level 30 comprises a functional block for hardware access 32.

To obtain access to the functional blocks 20, 24, 28, 32 of the different levels 18, 22, 26, 30, a separate authentication process 34, that is symbolized by an openable switch in FIG. 1, has to be carried out for each level. On each authentication process 34, a random number is generated in the embodiment shown that is transmitted to the accessing browser via the Ethernet connector 12. The browser encrypts the random number using a public key that is included in a certificate of the browser. The encrypted random number is subsequently sent back to the PLC 10 and is decrypted there using a private key. If the result of the decryption coincides with the original random number, access is granted to the respective level 18, 22, 26, 30. In order, for example, to obtain access to the operating system kernel 28, three authentication processes 34 are thus necessary, namely for the fourth level 18, for the third level 22, and for the second level 26.

The schematic design of the PLC 10 is shown in more detail in FIG. 2, with the PLC 10 substantially comprising three sectors. The first sector is a hardware level 36 to which the Ethernet connector 12 belongs. The hardware level 36 additionally comprises the hardware components for a CAN bus (controller area network bus), for a USB connection 40 (universal serial bus), for an encoder 42, and for a touch-sensitive screen 44.

The hardware layer 36 is controlled by an operating system 46 that forms the second sector and is, for example real-time capable. The operating system 46 comprises a CAN driver 48 that controls the CAN bus 38. The operating system 46 furthermore comprises a USB driver 50 for controlling the USB connection 40.

The encoder 42 is controllable by the operating system 46 via an encoder driver 52. An Ethernet stack 54 ensures the function of the Ethernet connector 12. A graphics driver 56 takes over the control of the touch-sensitive screen 44.

The operating system 46 additionally provides different services which include an input/output management 58 (I/O management), the monitoring service 34 and a hot code swap service 60. The I/O management 58 in this respect enables access to hardware functions, for example to the CAN bus 38. The monitoring service 24 permits processes of the operating system 46 to be monitored and individual registers of the operating system 46 to be displayed, for example.

To change the functionality of the PLC 10 in ongoing operation, the hot code swap service 60 is used that enables changes to be made to the operating system 46 with respect to the runtime.

The operating system 46 additionally provides the web server 20.

A code management 62 that represents the third sector of the PLC 10 sits on top of the operating system 46. The code management 62 substantially serves to execute a user program 64. The user program 64 can serve for the control of an automation plant, for example. The operating system 46 of the PLC 10 can generally also be called firmware and the user program 64 software or an application program.

To execute the user program 64, the code management 62 comprises libraries 66 that are not included in the information contained in the user program 64. The code management 62 furthermore comprises websites 68 that can be displayed by the web server 20 as well as a key management 70.

The key management 70 present in the embodiment essentially provides the functionality shown in FIG. 1 of the authentication at different levels 18, 22, 26, 30 by means of a plurality of authentication processes 34. The key management 70 additionally comprises a user management (not shown) in the form of an access control matrix (ACM). For the authentication, the key management generates the random numbers for the respective authentication processes 34. The key management 70 communicates with the different functional blocks 20, 24, 28, 32, 60 by means of a DBus 72. In this respect, communication takes place with the I/O management 58 for authentication for the first level 30 to permit hardware accesses 32 and accesses to the operating system kernel of the operating system 46 in the second level 26.

Accesses to the monitoring service 24 require an authentication process 34 for the third level 22, for which purpose the key management 70 communicates with the monitoring service 24. The hot code swap service 60 is likewise associated with the third level 22 (not shown in FIG. 1) so that the key management also communicates with the hot code swap service 60. A data exchange between the key management 70 and the web server 20 takes place for accesses to the web server 20.

In addition to accesses to the hardware level 36 and to the operating system 46, the key management can also carry out an authentication process 34 for the user program 64, whereby, for example, blocked parts of the user program 64 can be executed.

Depending on the importance of the different functional blocks 20, 24, 28, 32, 60, a different safety level can be generated by the breakdown of the PLC 10 into different levels 18, 22, 26, 30 and to the association of different functional blocks 20, 24, 28, 32, 60 with these levels. In this respect, a weighing up can be made between the required effort and the required safety level.

REFERENCE NUMERAL LIST

10 PLC
12 Ethernet connector 14 firewall
16 firewall rules
18 fourth level
20 web server
22 third level
24 monitoring service
26 second level
28 operating system kernel
30 first level
32 hardware access
34 authentication process
36 hardware level
38 CAN bus
40 USB connection
42 encoder
44 touch-sensitive screen
46 operating system
48 CAN driver
50 USB driver
52 encoder driver
54 Ethernet stack
56 graphics driver
58 input/output management
60 hot code swap service
62 code management
64 user program
66 libraries
68 websites
70 key management
72 DBus

The invention claimed is:

1. A method of accessing functions of an embedded device, the method comprising:
    (a) associating functional blocks of the embedded device with at least two levels disposed above one another hierarchically;
    (b) accessing to a functional block of the embedded device from outside the embedded device by a data interface; and
    (c) authenticating during the accessing for a level with which the respective functional block is associated, and subsequently and serially performing an authentication for every level above the level associated with the functional block to permit an execution of a function of the functional block, each authentication performed being a prerequisite for a subsequent authentication,
    wherein the functions of the functional blocks permit access to firmware of the embedded device,
    for each level of the at least two levels, successful authentication permits access to associated functional blocks, and
    authentication for each of the at least two levels includes transmission of a one-time-use value to a device requesting access, receipt of an encrypted value from the device requesting access, decryption of the encrypted value to generate a decrypted value, determining whether the decrypted value matches the one-time-use value, and determination that authentication is successful when the decrypted value matches the one-time-use value.

2. The method in accordance with claim 1, wherein the embedded device is a programmable logic controller.

3. The method in accordance with claim 1, wherein the functions of the functional blocks also permit access to an application program executed on the embedded device.

4. The method in accordance with claim 1, wherein the authentication for different levels takes place by different keys.

5. The method in accordance with claim 1, wherein the embedded device uses a key-based cryptographic process for authentication for a level.

6. The method in accordance with claim 1, wherein a first functional block that permits direct access to hardware of the embedded device is arranged in a first level that is a lowest level.

7. The method in accordance with claim 6, wherein a function belonging to the first functional block permits direct access to a network interface.

8. The method in accordance with claim 6, wherein a second functional block that permits direct access to an operating system kernel of the embedded device is arranged in a second level that is disposed above the first level.

9. The method in accordance with claim 8, wherein a function belonging to the second functional block permits direct access to a file system.

10. The method in accordance with claim 8, wherein a third functional block that permits access to the executed application program is arranged in a third level that is disposed above the second level.

11. The method in accordance with claim 10, wherein a function belonging to the second functional block permits a monitoring of the executed application program.

12. The method in accordance with claim 10, wherein a fourth functional block that permits access to a web server of the embedded device is arranged in a fourth level that is disposed above the third level.

13. The method in accordance with claim 2, wherein a function belonging to the fourth functional block permits a data input and a data output at the web server.

14. The method in accordance with claim 1, wherein access to functions of the embedded device is checked by a firewall of the embedded device.

15. The method in accordance with claim 1, wherein a user management is used in which users are stored to whom authentication for predefined functional blocks is permitted.

16. An embedded device comprising:
    a data interface;
    a processing device; and
    a memory device;
    wherein the processing device is configured to:
    a) associate functional blocks of the embedded device with levels disposed above one another hierarchically;
    b) carry out an authentication during access to a functional block of the embedded device from outside the embedded device by the data interface for a level with which the functional block is associated, and subsequently and serially carry out an authentication for every level disposed above the level associated with the functional block before an execution of a function of the functional block is permitted, each authentication performed being a prerequisite for a subsequent authentication,
    wherein functions of the functional blocks permit access to firmware of the embedded device,
    for each level of the at least two levels, successful authentication permits access to associated functional blocks, and authentication for each of the at least two levels includes transmission of a one-time-use value to a device requesting access, receipt of an encrypted value from the device requesting access, decryption of the encrypted value to generate a decrypted value, determining whether the decrypted value matches the one-time-use value, and determination that authentication is successful when the decrypted value matches the one-time-use value.

17. The embedded device in accordance with claim 16, wherein the functions of the functional blocks that permit access to firmware of the embedded device also permit access to an application program executed on the embedded device.

18. The embedded device in accordance with claim 17, wherein the embedded device is a programmable logic controller.

19. The embedded device in accordance with claim 16, wherein the embedded device is configured to execute a real-time application.

20. The embedded device in accordance with claim 16, further comprising a fieldbus connector and the embedded device is operable at a voltage of 24 volts.

\* \* \* \* \*